United States Patent [19]

Sevier

[11] Patent Number: 4,887,946
[45] Date of Patent: Dec. 19, 1989

[54] LOAD ENCLOSING CHAIN RELEASE

[76] Inventor: Jeff R. Sevier, R.D. #3, Richards Rd., Cazenovia, N.Y. 13035

[21] Appl. No.: 255,956

[22] Filed: Oct. 11, 1988

[51] Int. Cl.$^4$ .............................................. B60P 7/10
[52] U.S. Cl. ..................................... 410/32; 292/160; 292/264; 410/99; 296/6
[58] Field of Search ........................ 410/31, 32, 34, 41, 410/97, 99, 153, 155; 296/3, 6, 36; 292/160, 161, 264

[56] References Cited

U.S. PATENT DOCUMENTS

| | | |
|---|---|---|
| 215,746 | 5/1879 | McDaniel . |
| 299,817 | 6/1884 | Madisen . |
| 331,421 | 12/1885 | Melins . |
| 396,278 | 1/1889 | Hendrick . |
| 498,056 | 5/1893 | Higgins et al. .................. 410/32 X |
| 900,794 | 10/1908 | Stoffels ............................... 292/160 |
| 2,660,752 | 12/1953 | Carcereny ..................... 292/160 X |
| 4,078,523 | 3/1978 | Etzler . |

FOREIGN PATENT DOCUMENTS 286041 11/1913 Fed. Rep. of Germany ...... 292/160

Primary Examiner—Johnny D. Cherry
Assistant Examiner—Gary C. Hoge
Attorney, Agent, or Firm—Leon Gilden

[57] ABSTRACT

A chain release apparatus is set forth wherein a vertically reciprocating plate is mounted within a post accepting a plurality of chains across a passageway formed by a second post wherein the chains are positionable over vertically oriented fingers integrally formed to the reciprocating plate. The post is formed with a plurality of cylindrical abutments surrounding the fingers in a lower position and positioned adjacent an upper end of the fingers in a second position when the plate is dropped to a lowered second position.

7 Claims, 3 Drawing Sheets

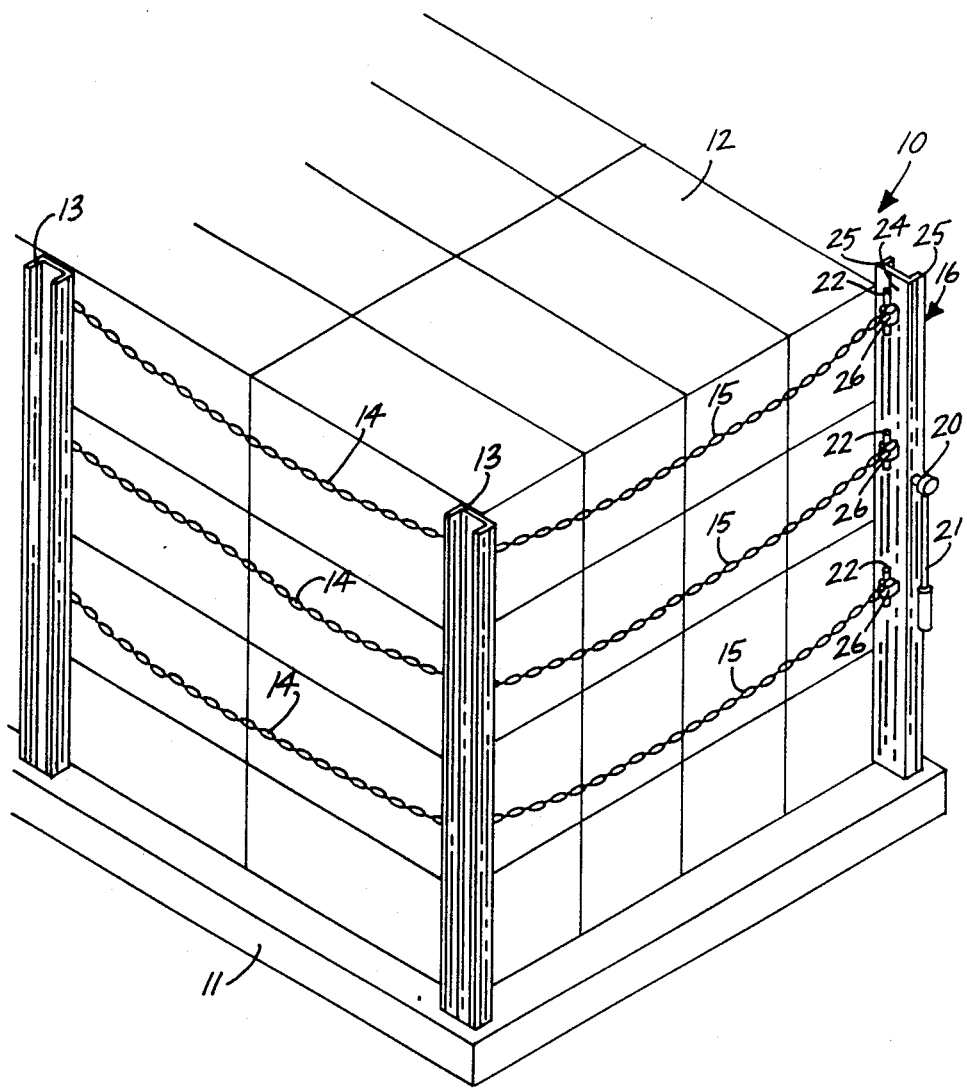

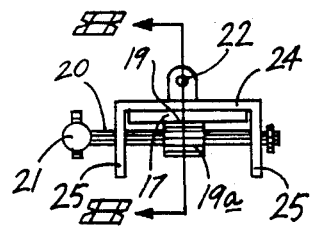
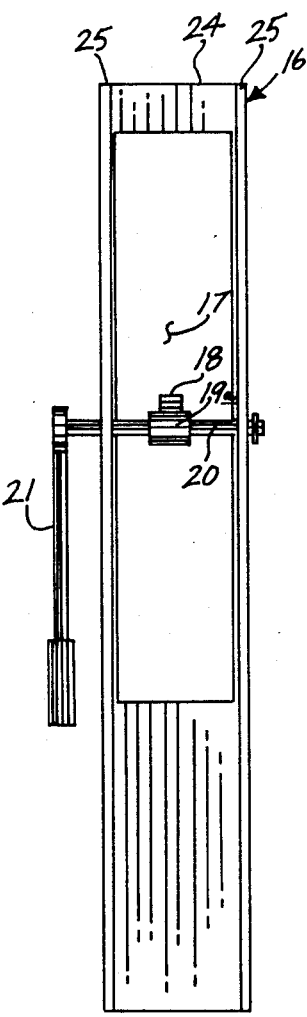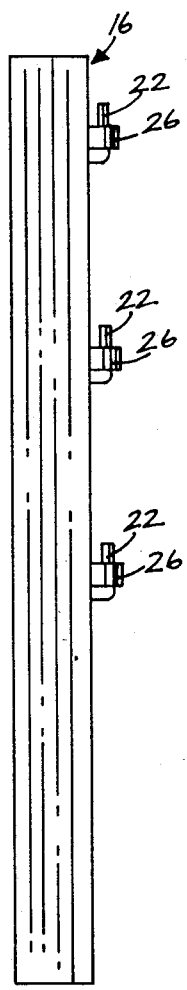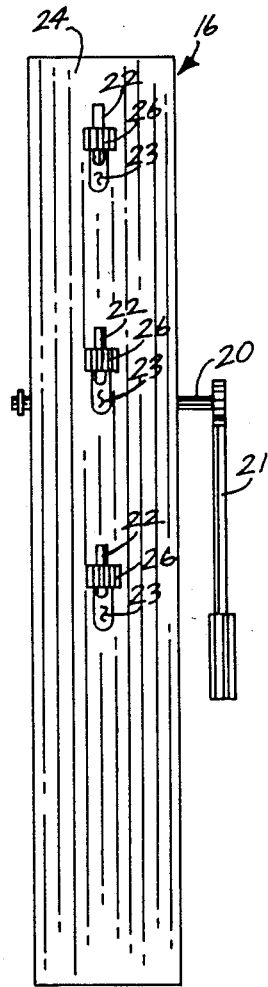

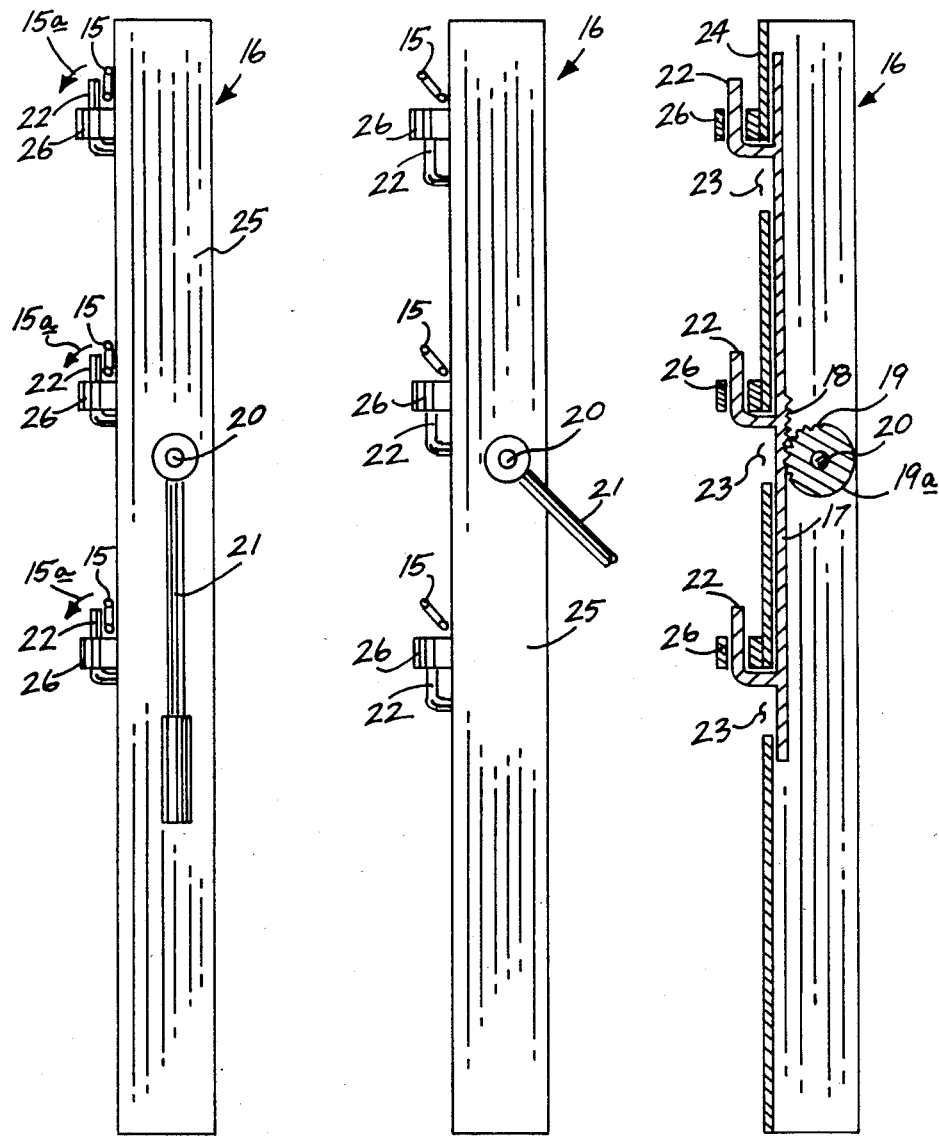

LOAD ENCLOSING CHAIN RELEASE

BACKGROUND OF THE INVENTION

1. Field of the Invention

The field of invention relates to transport equipment, and more particularly pertains to a new and improved load enclosing chain release wherein the same may easily secure the opening defined by a hay wagon and the like utilized in agriculture.

2. Description of the Prior Art

The use of various load enclosing mechanisms has been utilized in the prior art. As may be appreciated, these devices have normally been of a relatively complex organization to enable effectiveness or alternatively, have been of rudimentary construction limiting their utility when applied in the transport of hay due to the shifting of such cargo and the resultant binding of tethering devices utilized. For example, U.S. Pat. No. 215,746 to Holler sets forth a load binder for a hay rack wherein a sliding sleeve is positionable vertically relative to a post wherein the sleeve is provided with a hook for acceptance of a bar therethrough for securement ostensibly of a load of hay.

U.S. Pat. No. 299,817 to Madison sets forth a post formed of a telescoping ratcheting portion having secured thereto a locking ring for acceptance of rods and the like for use as a hay binder in association with a wagon.

U.S. Pat. No. 331,421 to Melins sets forth a load binder for use with wagons and the like wherein flexible lines are secured about a load by use of a windlass arrangement to maintain a load on the associated wagon.

U.S. Pat. No. 396,278 to Henderick sets forth a hay binder formed with a plurality of chain links to secure a hay load to an associated wagon.

U.S. Pat. No. 4,078,523 to Etzler sets forth a hay wagon utilizing flexible tethers for maintaining of the load therewithin wherein a windlass may adjust tension to the load to maintain the hay bales within the wagon.

U.S. Pat. No. 4,580,843 to Lund sets forth a hay bale rack utilizing an elongate frame formed with a plurality of parallel bale retaining rods for maintaining the hay bales within the wagon.

As such, it may be appreciated that there is a continuing need for a new and improved load enclosing chain release apparatus for maintaining a load of hay within a wagon which includes the characteristics of ease of use and effectiveness, and in this respect the present invention substantially fulfills this need.

SUMMARY OF THE INVENTION

The present invention provides a load enclosing chain release wherein the same may be readily positioned about a hay wagon gate and easily and effectively disengaged to enable loading and unloading of the hay wagon. As such, the general purpose of the present invention, which will be described subsequently in greater detail, is to provide a new and improved load enclosing chain release apparatus which has all the advantages of the prior art loading enclosing devices and none of the disadvantages.

To attain this, the present invention comprises a plurality of vertically oriented spaced posts associated with a hay wagon with flacid chains secured therebetween wherein two of the posts utilize removable chains. One of the two posts is provided with a series of hooks for accepting a forward chain link therearound with a cylinder slidably positioned relative to each hook and secured to the post whereupon sliding of the hooks downwardly will withdraw the chain link from each associated hook.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, method and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved load enclosing chain release device which has all the advantages of the prior art load enclosing chain release devices and none of the disadvantages.

It is another object of the present invention to provide a new and improved load enclosing chain release device which may be easily and efficiently manufactured and marketed.

It is a further object of the present invention to provide a new and improved load enclosing chain release device which is of a durable and reliable construction.

An even further object of the present invention is to provide a new and improved load enclosing chain release device having a low cost of manufacture with regard to both materials and labor, and which accordingly is then capable of low prices of sale to the consuming public, thereby making such load enclosing chain release devices economically available to the buying public.

Still yet another object of the present invention is to provide a new and improved load enclosing chain release device which provides in the apparatuses and methods of the prior art some of the advantages thereof, while simultaneously overcoming some of the disadvantages normally associated therewith.

Still another object of the present invention is to provide a new and improved load enclosing chain release device wherein the same is provided with a gate accepting a plurality of vertically repositionable hooks to withdraw associated chain links positioned about the hooks upon vertical repositioning of the hooks.

These together with other objects of the invention, along with various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the instant invention.

FIG. 2 is a top orthographic view of the release mechanism of the instant invention.

FIG. 3 is a rear orthographic view of the release mechanism of the instant invention.

FIG. 4 is a side orthographic view of the release mechanism of the instant invention.

FIG. 5 is a frontal orthographic view the release mechanism of the instant invention.

FIG. 6 is a side orthographic view of the instant invention illustrating the chain links positioned proximate the hooks.

FIG. 7 is a side orthographic view of the instant invention taken in elevation illustrating the chain links withdrawn from the hooks.

FIG. 8 is an orthographic view taken along the lines 8—8 of FIG. 2 in the direction indicated by the arrows.

DESCRIPTION OF THE PREFERRED EMBODIMENT

With reference now to the drawings, and in particular to FIGS. 1 to 8 thereof, a new and improved load enclosing chain release apparatus embodying the principles and concepts of the present invention and generally designated by the reference numeral 10 will be described.

More specifically, it will be noted that the load enclosing chain release apparatus 10 essentially comprises a hay wagon support bed 11 of conventional configuration as may be secured to a tractor, truck, or other transport device. Integrally secured about the upper surface of the support bed 11 are a series of vertical support posts 13 provided with a plurality of securement chains 14 therebetween to encompass the perimeter of the bed 11 and maintain a stack of hay bales 12 confined therein. To provide a gate for loading and unloading of hay bales 12 onto the support bed 11 are a series of gate chains 15 secured between a support post 13 and a gate support post 16. The support post and gate support post are each of "U" shaped cross-sectional configuration wherein the support post 13 may be of any desirable configuration, but the gate support post 16 is desirably of "U" shaped configuration to enable access to the mechanism slidingly confined between the legs 25 of the gate support post 16, as illustrated in FIG. 2 for example.

The mechanism includes a plate member 17 mounted for vertical movement between the legs 25 of post 16 against an interior face of the connecting web 24 of the post, as illustrated in FIGS. 2 and 3. The plate 17 is formed with a series of rack teeth 18 cooperative with pinion teeth 19 integrally formed about an exterior surface of the enlarged shaft 19a, as illustrated in FIGS. 2 and 3. The enlarged shaft 19a is fixedly mounted to shaft 20 pivotally movable by means of handle 21 depending downwardly adjacent an exterior face of a lag 25 of the post 16.

Integrally mounted in exterior face of the plate 17 are a series of aligned upwardly projecting hooks 22, as illustrated in FIG. 8. The hooks 22 extend through aligned openings 23 formed through the connecting web 24. The openings 23 and hooks 22 are positioned in alignment to one another to enable vertical movement of the plate 17, and its associated integrally formed hooks 22 upon pivotal rotation of the handle 21. Integrally formed at upper ends of each respective opening 23 is an ejector leg 26 formed generally of cylindrical configuration and formed with a through extending aperture to accept each respective hook 22. In use, the gate chains 15 are positioned between a vertical support post 13 and the gate support post 16 upon filling the hay wagon support bed 11 with associated hay bales 12. A remote link of the gate chain 15 is positioned over a respective hook 22 in the direction of arrows 15a, as illustrated in FIG. 6. Upon vertical repositioning of the plate 17 by pivotal movement of the handle 21, as illustrated in FIG. 7, the respective hooks 22 are forced downwardly through the respective openings 23 and are vertically moved downwardly with respect to the apertures formed within the ejector legs 26 to thereby force the respective chains 15 to relatively separate from the hooks 22, as illustrated in FIG. 7. It may be appreciated that the plate 17 is of a width substantially equal to that of the spacing of the legs 25 to maintain the alignment of plate 17 within the interior surface formed by legs 25 and the connecting web 24.

As to the manner of usage and operation of the instant invention, the same should be apparent from the above description and accordingly no further discussion relative to the manner of usage and operation shall be set forth.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A load enclosing chain release apparatus for use in combination with a platform wagon comprising,
   a plurality of support posts integrally secured about a perimeter of said wagon, and
   a gate post integrally secured to said wagon wherein said gate post is spaced from at least one of said support posts to provide an opening therebetween, and at least one elongate chain member including a series of links said elongate chain member being integrally secured to one of said support posts and removably securable to hooks slidably associated with said gate post at the other end of said elongate chain, and latch means slidably mounted within said gate post for removably disassociating said elongate chain member from said gate post, and wherein a terminal link of said elongate chain member is releasably securable to said hooks, and wherein said hooks are integrally secured to said latch means and said latch means is reciprocatably slidable relative to said gate post, wherein said latch means includes a plate member slidably mounted in said gate post and said post is of a "U" shaped cross-sectional configuration, and said plate member is of a width substantially equal to the spacing between legs of said "U" shaped configuration and slidably mounted relative to an interior face of a connecting web connecting said legs.

2. A load enclosing chain release apparatus as set forth in claim 1 wherein said hooks project through a series of elongate openings formed through said web and projecting upwardly along an exterior face of said web.

3. A load enclosing chain release apparatus as set forth in claim 2 wherein said hooks are reciprocatably mounted to project through a respective number of ejector legs integrally secured to said outer face of said web and formed with apertures therethrough to accept said hooks therethrough.

4. A load enclosing chain release apparatus as set forth in claim 3 wherein said ejector legs are of a height less than each respective hook to accept said terminal chain link thereon.

5. A load enclosing chain release apparatus as set forth in claim 4 wherein said plate is formed with a series of rack teeth cooperative with a series of pinion teeth to reciprocate said plate relative to said gate post.

6. A load enclosing chain release apparatus as set forth in claim 5 wherein said pinion teeth are integrally formed about an exterior face of an enlarged shaft rotatably mounted on a rotating shaft through said legs.

7. A load enclosing chain release apparatus as set forth in claim 6 wherein a handle is integrally formed to a terminal end of said rotating shaft for effecting reciprocation of said plate member when said handle is pivoted relative to said gate post.

* * * * *